（12）United States Patent
Song

(10) Patent No.: US 11,736,871 B2
(45) Date of Patent: Aug. 22, 2023

(54) SMART HEARING DEVICE FOR DISTINGUISHING NATURAL LANGUAGE OR NON-NATURAL LANGUAGE, ARTIFICIAL INTELLIGENCE HEARING SYSTEM, AND METHOD THEREOF

(71) Applicant: Olive Union, Inc., Seoul (KR)

(72) Inventor: Myung Geun Song, Seoul (KR)

(73) Assignee: Olive Union, Inc., Seoul (KR)

( * ) Notice: Subject to any disclaimer, the term of this patent is extended or adjusted under 35 U.S.C. 154(b) by 380 days.

(21) Appl. No.: 16/973,347

(22) PCT Filed: Sep. 9, 2020

(86) PCT No.: PCT/KR2020/012146
§ 371 (c)(1),
(2) Date: Dec. 8, 2020

(87) PCT Pub. No.: WO2022/054978
PCT Pub. Date: Mar. 17, 2022

(65) Prior Publication Data
US 2022/0322015 A1    Oct. 6, 2022

(51) Int. Cl.
*H04R 25/00* (2006.01)
*G10L 25/51* (2013.01)
*G10L 25/84* (2013.01)

(52) U.S. Cl.
CPC ............ *H04R 25/505* (2013.01); *G10L 25/51* (2013.01); *G10L 25/84* (2013.01); *H04R 25/405* (2013.01);
(Continued)

(58) Field of Classification Search
CPC ............ H04R 2225/43; H04R 2225/55; H04R 2410/01; H04R 25/405; H04R 25/407;
(Continued)

(56) References Cited

FOREIGN PATENT DOCUMENTS

| KR | 102156570 B1 | * | 9/2020 | |
|---|---|---|---|---|
| WO | WO-0176321 A1 | * | 10/2001 | ........... H04R 25/505 |
| WO | WO-2022054978 A1 | * | 3/2022 | ............. G10L 15/18 |

OTHER PUBLICATIONS

KR-102156570-B1. English Translation (Year: 2020).*

* cited by examiner

*Primary Examiner* — Phylesha Dabney
(74) *Attorney, Agent, or Firm* — Taft Stettinius & Hollister LLP

(57) ABSTRACT

The inventive concept relates to a smart hearing device for providing a control parameter and feedback for a natural language or a non-natural language determined by analyzing sound data, which includes a receiving unit that receives sound data of a voice signal and a noise signal from a first microphone and a second microphone being formed at one side, a determination unit that compares digital flow of the sound data with a previously stored graph pattern to determine a natural language or a non-natural language for the sound data, a processing unit that matches similar data for the determined natural language or non-natural language, based on a database including a natural language area and a non-natural language area, and a providing unit that provides a user with a one-sided sound converted by setting a control parameter in a natural language or a non-natural language specified according to the matched similar data.

14 Claims, 10 Drawing Sheets

(52) U.S. Cl.
CPC ......... *H04R 25/407* (2013.01); *H04R 25/558* (2013.01); *H04R 25/604* (2013.01); H04R 2225/43 (2013.01); H04R 2225/55 (2013.01); H04R 2410/01 (2013.01)

(58) Field of Classification Search
CPC .. H04R 25/505; H04R 25/558; H04R 25/604; H04R 1/40; H04R 25/00; G10L 25/84; G10L 25/51
USPC .......................................................... 381/313
See application file for complete search history.

SMART HEARING DEVICE FOR DISTINGUISHING NATURAL LANGUAGE OR NON-NATURAL LANGUAGE, ARTIFICIAL INTELLIGENCE HEARING SYSTEM, AND METHOD THEREOF

TECHNICAL FIELD

Embodiments of the inventive concept described herein relate to a smart hearing device for distinguishing a natural language or a non-natural language, an artificial intelligence hearing system, and a method thereof, and more particularly, relate to technologies of providing a control parameter and feedback for a natural language or a non-natural language determined by analyzing sound data.

BACKGROUND ART

Recently, with the leaping development of the medical engineering technology, patients who previously wear their hearing aids and receive little help have promoted excellent hearing enhancement by selecting and wearing suitable hearing aids.

A hearing aid is an advanced medical device which is always added to the body to be used among medical devices. The hearing aid should be steadily managed according to changes in hearing and should receive an A/S for a portion damaged due to humidity and foreign substances in ears. Thus, the hearing aid is considered one of the most important technologies among medical engineering technologies.

A conventional hearing aid is in the form of a trumpet-shaped sound collector, but is usually used at present in the form of an electric hearing aid helping to amplify sounds. Furthermore, the hearing aid has a bone conduction type where it is mounted on the regio mastoidea, but usually has a structure of the air conduction type, which receives sound waves through its microphone to convert the sound waves into electrical vibration, expands it to convert it into sound waves using its earphone to listen to it through ears.

Recently, research has been conducted in a stronger dedicated processor for hearing aid. The dedicated processor for hearing aid has a processing speed more than twice as fast as a conventional processor and loads its memory, and is composed of chips and components, which are formed to be small with advanced nanotechnology.

Herein, because the technology for the conventional hearing aid is set based on hearing data of the hard of hearing (hereinafter referred to as "user"), there is a limitation that data for real-time surrounding noise of the user is not applied.

Furthermore, the technology for the conventional hearing aid predicts voices of persons by simply classifying a vocal range and distinguishing external noise from voices of persons, but it has bad performance and does not distinguish a natural language from a non-natural language. Furthermore, a human vocal range interval is considerably wide because of being in a range of about 500 Hz to 5000 Hz, but the technology for the conventional hearing aid has a limitation that a voice highlighting function and a noise cancellation function are not implemented well because a specific vocal range interval of the voice is recognized as external noise.

DETAILED DESCRIPTION OF THE INVENTION

Technical Problem

The object of the inventive concept is to identify a voice of a user and noise by distinguishing a natural language from a non-natural language and provide more effective hearing aid performance using different parameters and feedback.

Furthermore, the object of the inventive concept is to three-dimensionally recognize an environmental change and a noise change according to left and right sound directionality using a first smart hearing device and a second smart hearing device respectively worn on the left and the right of the user.

Technical Solution

According to an exemplary embodiment, a smart hearing device may include a receiving unit that receives sound data of a voice signal and a noise signal from a first microphone and a second microphone being formed at one side, a determination unit that compares digital flow of the sound data with a previously stored graph pattern to determine a natural language or a non-natural language for the sound data, a processing unit that matches similar data for the determined natural language or non-natural language, based on a database including a natural language area and a non-natural language area, and a providing unit that provides a user with a sound of one side, the sound being converted by setting a control parameter in a natural language or a non-natural language specified according to the matched similar data.

Furthermore, the smart hearing device may further include a feedback transmitting unit that provides feedback in response to the natural language or the non-natural language specified according to the matched similar data.

The receiving unit may detect the voice signal and the noise signal from the first microphone and the second microphone formed at different locations and may digitally convert the voice signal and the noise signal to receive the sound data.

The determination unit may compare digital flow of the digitally converted sound data with a graph pattern of a volume graph for time and a volume graph for frequency, the graph pattern being previously stored, to determine a natural language or a non-natural language indicating a specific pattern in values of the graph.

The processing unit may match similar data of a word and sentence similar to the sound data determined as the natural language or may match similar data of environmental noise, noise, and a new sound similar to the sound data determined as the non-natural language, based on the database.

The providing unit may set control parameters of at least any one or more of a change in amplification value, volume adjustment, and frequency adjustment according to an environmental change based on hearing data of the user and the natural language or the non-natural language specified according to the matched similar data and may provide the sound of one side in a user-customized form.

The providing unit may set the control parameters in the sound data of a digital signal received from the first microphone and the second microphone to adjust balances of at least any one or more of the change in amplification value, the volume adjustment, and the frequency adjustment and may convert a digital signal for the adjusted signal into an analog signal to provide the user with the sound of one side.

The feedback transmitting unit may provide feedback of a word and sentence in response to the similar data, when the similar data of a word and sentence similar to the sound data determined as the natural language or the non-natural language is matched by the processing unit.

The feedback transmitting unit may extract the feedback of the word and sentence in response to a question due to a voice of the user and may transmit the feedback with a voice message, when the similar data of the word and sentence similar to the sound data is matched based on artificial intelligence (AI).

According to an exemplary embodiment, an artificial intelligence hearing system may include a first smart hearing device that determines a natural language or a non-natural language for first sound data including a voice signal and a noise signal received from a first microphone and a second microphone formed at one side and sets a first control parameter due to matching of similar data for the determined natural language or non-natural language to provide a sound of one side, a second smart hearing device that determines a natural language or a non-natural language for second sound data including a voice signal and a noise signal received from a third microphone and a fourth microphone formed at the other side and sets a second control parameter due to matching of similar data for the determined natural language or non-natural language to provide a sound of the other, and a mobile device that controls the first smart hearing device and the second smart hearing device.

The first smart hearing device and the second smart hearing device may respectively include the first microphone and the third microphone located near the mouth of a user and may respectively include the second microphone and the fourth microphone located at a spaced distance from the mouth of the user.

The first smart hearing device and the second smart hearing device may respectively provide a user with a sound of one side and a sound of the other in a customized form to three-dimensionally recognize an environmental change and a noise change according to left and right sound directionality.

The first smart hearing device and the second smart hearing device may respectively set the first control parameter and the second parameter, each of which has a different parameter value, based on left hearing data and right hearing data of a user.

The mobile device may control any one or more of power-on/off of each of the first smart hearing device and the second smart hearing device, signal collection, and a control parameter setting depending on a selective input of a user.

According to an exemplary embodiment, an operation method of a smart hearing device for distinguishing a natural language or a non-natural language may include receiving sound data of a voice signal and a noise signal from a first microphone and a second microphone formed at one side, comparing digital flow of the sound data with a previously stored graph pattern to determine a natural language or a non-natural language for the sound data, matching similar data for the determined natural language or non-natural language, based on a database including a natural language area and a non-natural language area, and providing a user with a sound of one side, the sounding being converted by setting a control parameter in a natural language or a non-natural language specified according to the matched similar data.

Furthermore, the operation method may further include providing feedback in response to the natural language or the non-natural language specified according to the matched similar data.

Advantageous Effects of the Invention

According to an embodiment of the inventive concept, more effective hearing aid performance may be provided using different parameters and feedback by identifying a voice of the user and noise by distinguishing a natural language from a non-natural language.

Furthermore, according to an embodiment of the inventive concept, a customized hearing aid service in an environmental change and a noise change according to left and right sound directionality may be provided using a first smart hearing device and a second smart hearing device respectively worn on the left and the right of the user, and convenience of using the hearing aid according to it may be improved.

BEST MODE

Figure 1:
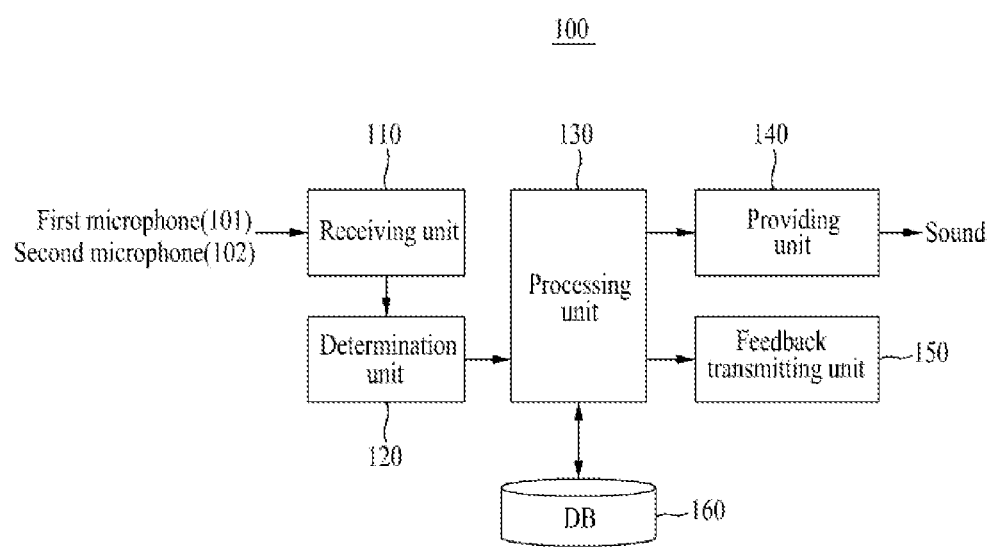
FIG. 1 is a block diagram illustrating a detailed configuration of a smart hearing device according to an embodiment of the inventive concept.

Hereinafter, embodiments according to the inventive concept will be described in detail with reference to the accompanying drawings. However, the inventive concept is restricted or limited to embodiments of the inventive concept. Further, like reference numerals shown in each drawing indicates like members.

Further, the terminology used in the specification may be terms used to properly represent an exemplary embodiment of the inventive concept and may vary according to intention of a viewer or an operator or custom of a field included in the inventive concept. Therefore, the terminology will be defined based on contents across the specification.

The inventive concept is a technology about a smart hearing device for distinguishing a natural language or a non-natural language, an artificial intelligence hearing system, and a method thereof, which is the gist of analyzing sound data of a voice signal and a noise signal received from smart hearing devices worn on ears of a user and providing control parameter settings and feedback according to matching of similar data depending on the determined result.

At this time, the smart hearing device according to an embodiment of the inventive concept may be a hearing aid which provides an amplified sound such that a user whose hearing is degraded may listen to it.

A description will be given in detail of a smart hearing device for distinguishing a natural language or a non-natural language according to an embodiment of the inventive concept, an artificial intelligence hearing system, and a method thereof, which are capable of improving convenience according to a user-customized hearing aid service by controlling at least one or more of an amplification value, volume, and a frequency of a signal depending on the identified natural language or non-natural language and providing feedback according to it, with reference to FIGS. 1 to 7.

FIG. 1 is a block diagram illustrating a detailed configuration of a smart hearing device according to an embodiment of the inventive concept.

Referring to FIG. 1, the smart hearing device according to an embodiment of the inventive concept may provide a control parameter and feedback for a natural language or a non-natural language determined by analyzing sound data.

A smart hearing device 100 according to an embodiment of the inventive concept, which will be described below, may be worn on the left or right ear of a user, which may be a first smart hearing device or a second smart hearing device. The first smart hearing device and the second smart hearing device are characterized by including a detailed configuration shown in FIG. 1, which will be described below, in the same manner.

To this end, the smart hearing device 100 according to an embodiment of the inventive concept may include a receiving unit 110, a determination unit 120, a processing unit 130, and a providing unit 140. Furthermore, the smart hearing device 100 according to an embodiment of the inventive concept may further include a feedback transmitting unit 150 and a database 160.

The receiving unit 110 may receive sound data of a voice signal and a noise signal from a first microphone 101 and a second microphone 102, which are formed at one side.

The receiving unit 110 may detect a voice signal and a noise signal from the first microphone 101 and the second microphone 102, which are formed at different locations, and may digitally convert the voice signal and the noise signal to receive sound data.

At this time, the first microphone 101 may receive a voice signal of the user, and the second microphone 102 may receive a noise signal around the user. In detail, because the first microphone 101 and the second microphone 102 are placed at different distances from the mouth of the user, the first microphone 101 is located adjacent to the mouth of the user to receive a voice signal based on a voice of the user and the second microphone 102 may be located as relatively further as possible from the mouth of the user than the first microphone 101 to receive a noise signal based on surrounding noise.

The first microphone 101 and the second microphone 102 according to an embodiment of the inventive concept may be arranged at different locations in the smart hearing device 100, but a direction where openings (or holes) of the first microphone 101 and the second microphone 102 are faced is characterized by being the same as each other to detect a uniform voice signal and a uniform noise signal and remove suitable noise according to it. Herein, the suitable noise may refer to noise and a numerical value except for a voice signal and a noise signal collected at a location of the microphone.

Thus, the receiving unit 110 may receive the voice signal and the noise signal detected by the first microphone 101 and the second microphone 102 and may convert the voice signal and the noise signal into an electrical signal, that is, digitally to receive sound data.

The determination unit 120 may compare digital flow of the sound data with a previously stored graph pattern to determine a natural language or a non-natural language for the sound data.

The determination unit 120 may compare digital flow of the digitally converted sound data with a graph pattern of a volume graph for time and a volume graph for frequency, which is previously stored, based on artificial intelligence (AI) to determine a natural language or a non-natural language indicating a specific pattern in values of the graph.

The natural language according to an embodiment of the inventive concept may indicate a word or sentence such as conversion between persons or a question of a user, and the non-natural language may indicate noise, such as a noisy sound of a construction site, a car sound, or a sound temporarily generated from a thing, and a sound (or a new sound) unfamiliar to persons. Each natural language and each non-natural language may indicate different specific patterns on a time-volume graph and a frequency-volume graph, and the specific pattern according to the graph may be stored and maintained in the database 160. For example, in the conversation of the user, the pitch of the sound may be present and continuity may occur, as compared with noise generated in construction sites. Thus, there may be a specific pattern on the time-volume graph and the frequency-volume graph for a sentence according to the conversation of the user, and there may be a specific pattern on the time-volume graph and the frequency-volume graph for noise generated in construction sites.

The determination unit 120 may compare digital flow of the digitally converted sound data with a graph pattern for a natural language and a non-natural language, which is stored and maintained in the database 160, to determine a natural language and a non-natural language indicating the specific pattern. For example, the determination unit 120 may compare and analyze the digitally converted sound data to determine a natural language or a non-natural language.

The processing unit 130 may match similar data for the determined natural language or non-natural language, based on the database 160 including a natural language area and a non-natural language area.

When the sound data is determined as the natural language or the non-natural language by the determination unit 120, the processing unit 130 may match similar data of a word and sentence similar to the sound data determined as the natural language or may match similar data of environmental noise, noise, and a new sound, which are similar to the sound data determined as the non-natural language, based on the database 160. In detail, the database 160 may include a natural language area including a word or sentence associated with the natural language and a non-natural language area including information associated with noise and an unfamiliar sound. When the sound data is determined as the natural language by the determination unit 120, the processing unit 130 may match similar data of a word or sentence similar to the sound data in the natural language area, based on the database 160.

As an example, when the noisy sound of the construction site or the car sound is determined as the non-natural language by the determination unit 120, the processing unit 130 may match similar data to noise of construction sites or car noise. Furthermore, when the unfamiliar sound is determined as the non-natural language by the determination unit 120, the processing unit 130 may match similar data to a new sound or new noise.

For another example, when the voices of the user and a person around the user are determined as the natural language by the determination unit 120, the processing unit 130 may match similar data such as "Hello" and "Long time no see" by the voices. Furthermore, when the question of the user is determined as the natural language by the determination unit 120, the processing unit 130 may match similar data, such as "How is the weather today?" or "Are you hungry" through related search of the database 160.

The providing unit 140 may provide the user with a sound of one side, which is converted by setting a control parameter in the natural language or the non-natural language specified according to the matched similar data.

At this time, the smart hearing device 100 according to an embodiment of the inventive concept may basically include hearing data (a personal hearing profile) of the user who uses a hearing aid. For example, the providing unit 140 may include hearing data of the user including volume and a frequency the user prefers, an amplification value of a degree to which the user does not feel a sense of difference, or a volume and frequency range. According to an embodiment, the above-mentioned data may be received by a mobile device 500 or an external server 600 interworking with the smart hearing device 100 according to an embodiment of the inventive concept and may be stored and maintained in the device 500 or the external server 600.

Herein, the hearing data is not limited to items or numerical values, such as an amplification value, volume and a frequency. For example, the hearing data may further include a user preference and a numerical value for at least any one or more of non-linear compression information of amplifying a small sound to be large and reducing a loud sound to be small, directional information capable of accurately detecting a direction of sound, feedback information helping to amplify a sound received through a microphone and listening to the sound well without other noise, and noise cancellation information of reducing noise.

The providing unit 140 may set control parameters of at least one or more of a change in amplification value, volume adjustment, and frequency adjustment according to an environmental change based on hearing data of the user and a natural language or a non-natural language specified according to the matched similar data and may provide a sound of one side in a user-customized form. At this time, the providing unit 140 may be characterized as applying different control parameter values to the natural language and the non-natural language. For example, although applying a control parameter of raising volume in the same manner, the providing unit 140 may more increase a control parameter value applied to the natural language than that applied to the non-natural language.

In detail, the providing unit 140 may set a control parameter in sound data of a digital signal received from the first microphone 101 and the second microphone 102 to adjust balances of at least any one or more of a change in amplification value, volume adjustment, and frequency adjustment and may convert a digital signal for the adjusted signal into an analog signal, thus providing the user with a sound of one side.

For example, at least any one or more of an amplification value, volume, and a frequency according to sound data received from the first microphone 101 and the second microphone 102 may be preset by the user or may depart from a preferred reference range. This may be generated by any one of a factor according to a change in the environment where the user is located, a factor according to a change in the voice of the user, a factor of a mechanical error, and a pitch factor by a natural language or a non-natural language. Thus, the providing unit 140 may adjust balances of at least any one or more of amplification values, volume, and frequencies of a voice signal and a noise signal based on the similar data for the natural language or the non-natural language matched by the processing unit 130 and may convert a digital signal according to the adjusted balance into an analog signal (acoustic energy), thus providing the user with a sound.

As an example, when similar data is matched to noise of construction sites or car noise by the processing unit 130, the providing unit 140 may adjust a balance of lowering volume for noise and provide the user with the adjusted sound.

For another example, when voices of the user and a surrounding person are matched to similar data such as "Hello" or "Long time no see" by the processing unit 130, the providing unit 140 may more adjust a balance of increasing an amplification value, volume, and a frequency of the matched similar data than surrounding noise and may more accurately provide the user with information to be delivered to the user.

In other words, the smart hearing device 100 according to an embodiment of the inventive concept may analyze sound data including a voice signal and a noise signal received from the first microphone 101 and the second microphone 102 depending on an environmental change of the user to determine a natural language or a non-natural language and may match similar data for the natural language or the non-natural language to set a control parameter for the sound data, thus providing a hearing aid service optimized for a changed situation although the user separately adjusts volume or a frequency to improve the convenience of using a hearing aid.

The feedback transmitting unit 150 of the smart hearing device 100 according to an embodiment of the inventive concept may provide feedback in response to the natural language specified according to the matched similar data.

When similar data of a word and sentence similar to the sound data determined as the natural language or the non-natural language is matched by the processing unit 130, the feedback transmitting unit 150 may provide feedback of the word and sentence in response to the similar data.

When similar data of a word and sentence similar to the sound data is matched based on artificial Intelligence (AI), the feedback transmitting unit 150 may extract feedback of the word and sentence in response to a question due to a voice of the user and may transmit the feedback with a voice.

As an example, when a noisy sound of the construction site or a car sound is determined as the non-natural language by the determination unit 120 and is matched to similar data of noise of the construction site or car noise by the processing unit 130, sound data corresponding to the non-natural language may be adjusted in balance by a control parameter. Thereafter, the feedback transmitting unit 150 may provide the user with feedback on the sound data corresponding to the non-natural language. For example, when similar data is matched to car noise, the feedback transmitting unit 150 may provide the user with a voice message notification such as "Be careful". As another example, when similar data is matched to new noise unfamiliar to the user, the feedback transmitting unit 150 may provide the user with a voice message notification such as "It's a new sound" or "It's a new environment".

As another example, when the question of the user is determined as a natural language by the determination unit 120 and is matched to similar data such as "How is the weather today?" or "Are you hungry", sound data corresponding to the natural language may be adjusted in balance by a control parameter. Thereafter, the feedback transmitting unit 150 may provide the user with feedback on the sound data corresponding to the natural language. For example, when similar data of "How is the weather today?" is matched, the feedback transmitting unit 150 may provide the user with a voice message notification such as "The weather is sunny today". As another example, when similar data of "Are you hungry" is matched, the feedback transmitting unit 150 may provide the user with a voice message notification such as "There is OOO in the nearby restaurant".

The smart hearing device 100 according to an embodiment of the inventive concept may further include a communication unit (not shown) which transmits sound data, similar data, a control parameter, and information associated with feedback to a mobile device or an external server and receives an input of the user from the mobile device.

For example, the communication unit may transmit sound data, similar data, a control parameter, and information associated with feedback to a mobile device the user has via a short-range wireless communication module of any one of Bluetooth, wireless fidelity (Wi-Fi), Zigbee, or Bluetooth low energy (BLE) and may receive a control command to control power-on/off of the smart hearing device 100 or a control parameter depending on a selective input of the user from the mobile device.

According to an embodiment, the communication unit of the smart hearing device 100 according to an embodiment of the inventive concept may communicate by wireless communication with a cellular telephone network, a wireless network, such as a wireless local area network (LAN) and/or a metropolitan area network (MAN), a network, such as an intranet and/or the Internet called the world wide web (WWW), and other devices, as well as the short-range wireless communication module.

Such wireless communication may include a protocol for email, such as global system for mobile communications (GSM), enhanced data GSM environment (EDGE), wideband code division multiple access (W-CDMA), code division multiple access (CDMA), time division multiple access (TDMA), Bluetooth, wireless fidelity (Wi-Fi) of IEEE 802.11a, IEEE 802.11b, IEEE 802.11g, IEEE 802.11n, and/or the like, voice over Internet Protocol (VoIP), Wi-MAX, long term evolution (LTE), Zigbee, Z-wave, Bluetooth low energy (BLE), beacon, Internet message access protocol (IMAP) and/or a post office protocol (POP), instant messaging, such as extensible messaging and presence protocol (XMPP), session initiation protocol for instant messaging and presence leveraging extensions (SIMPLE), instant messaging and presence service (IMPS), short message service (SMS), or LoRa, or a communication protocol which is not developed on the day of the filing date of the application. Herein, a plurality of communication standards, protocols, and technologies, which are not limited to them, may be used for the above-mentioned wireless communication.

Figure 2:
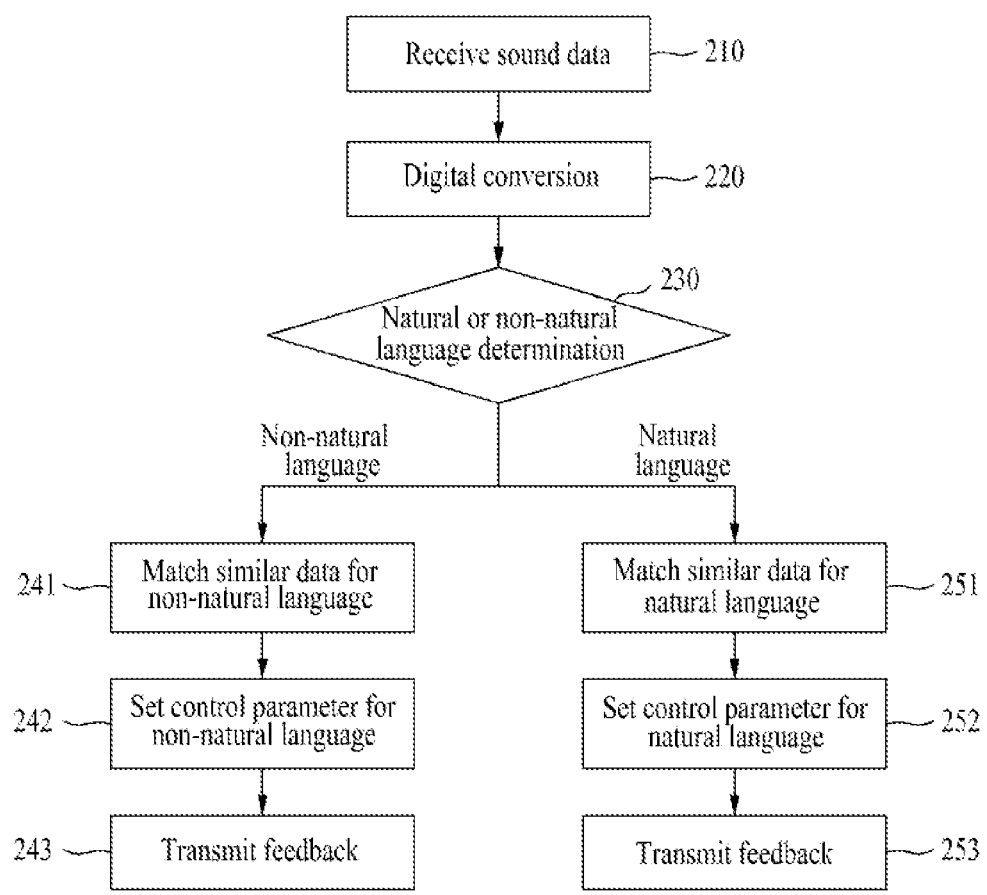
FIG. 2 is a flowchart illustrating an operation method of a smart hearing device according to an embodiment of the inventive concept.

FIG. 2 is a flowchart illustrating an operation method of a smart hearing device according to an embodiment of the inventive concept.

The operation method of FIG. 2 may be performed by a smart hearing device 100 according to an embodiment of the inventive concept in FIG. 1.

Referring to FIG. 2, in step 210, sound data of a voice signal and a noise signal may be received from a first microphone and a second microphone, which are formed at one side.

Step 210 may be to detect a voice signal and a noise signal from the first microphone and the second microphone formed at different locations, and step 220 may be to digitally convert the voice signal and the noise signal to receive sound data.

In step 230, digital flow of the sound data may be compared with a previously stored graph pattern to determine a natural language or a non-natural language for the sound data.

Step 230 may be to compare digital flow of the digitally converted sound data with a graph pattern of a volume graph for time and a volume graph for frequency, which is previously stored, based on artificial intelligence (AI) to determine a natural language or a non-natural language indicating a specific pattern in values of the graph.

The sound data may be classified as the natural language or the non-natural language in step 230. Steps 241 and 251 may be to match similar data for the determined natural language or non-natural language, based on a database including a natural language area and a non-natural language area. For example, when the noisy sound of the construction site or the car sound is determined as the non-natural language in step 230, step 241 may be to match similar data to noise of the construction site or car noise. Furthermore, step 251 may be to match similar data such as "Hello" and "Long time no see" by the voices, when voices of the user and a surrounding person are determined as the natural language in step 230, and to match similar data such as "How's the weather today?" or "Are you hungry" through related search of the database, when the question of the user is determined as the natural language in step 230.

Thereafter, in steps 242 and 252, a sound of one side, which is converted by setting a control parameter in the natural language or the non-natural language specified according to the matched similar data, may be provided to the user.

Steps 242 and 252 may be to set control parameters of at least any one or more of a change in amplification value, volume adjustment, and frequency adjustment according to an environmental change based on hearing data of the user and the natural language or the non-natural language specified according to the matched similar data to provide the sound of one side in a user-customized form.

For example, when the similar data is matched to noise of the construction site or car noise in step 241, step 242 may be to adjust a balance of lowering volume for noise and provide the user with the adjusted sound. Furthermore, when the voices of the user and the surrounding person are matched to the similar data such as "Hello" or "Long time no see" in step 251, step 252 may be to more adjust a balance of increasing an amplification value, volume, and a frequency of the matched similar data than surrounding noise and to more accurately provide the user with information to be delivered to the user.

At this time, each of steps 242 and 252 is characterized as applying different parameter values to the natural language and the non-natural language. In detail, although applying a control parameter of raising volume in the same manner, a control parameter applied to the natural language is more increased than that applied to the non-natural language.

Thereafter, in steps 243 and 253, feedback may be provided in response to the natural language or the non-natural language specified according to the matched similar data.

When similar data of a word and sentence similar to the sound data is matched based on artificial intelligence (AI), steps 243 and 253 may be to extract feedback of the word and sentence in response to a question of the user and to transmit the feedback with a voice.

For example, step 243 may be to provide the user with a voice message notification such as "Be careful", when similar data is matched to car noise, and to provide the user with a voice message notification such as "It's a new sound" or "It's a new environment", when similar data is matched to new noise unfamiliar to the user. Furthermore, step 253 may be to provide the user with a voice message notification such as "The weather is sunny today", when similar data of "How is the weather today?" is matched, and to provide the user with a voice message notification such as "There is OOO in the nearby restaurant", when similar data of "Are you hungry" is matched.

In a non-natural language area of steps 241, 242, and 243, the operation method of the smart hearing device according to an embodiment of the inventive concept may be to set a control parameter for noise to provide the user with a suitable sound, but may be to provide a voice message notification, such as "Be careful" or "It's a new sound", as feedback for a threatening sound or a new sound.

Likewise, in a natural language area of steps 251, 252, and 253, the operation method of the smart hearing device according to an embodiment of the inventive concept may be to set a control parameter for a conversion sound between users to provide the user with a suitable sound, but may be to provide an answer corresponding to a question of the user as feedback for the question of the user. At this time, the operation method of the smart hearing device according to an embodiment of the inventive concept may be to extract an answer suitable for the question of the user, which is a natural language, based on artificial intelligence (AI).

Figure 3A:
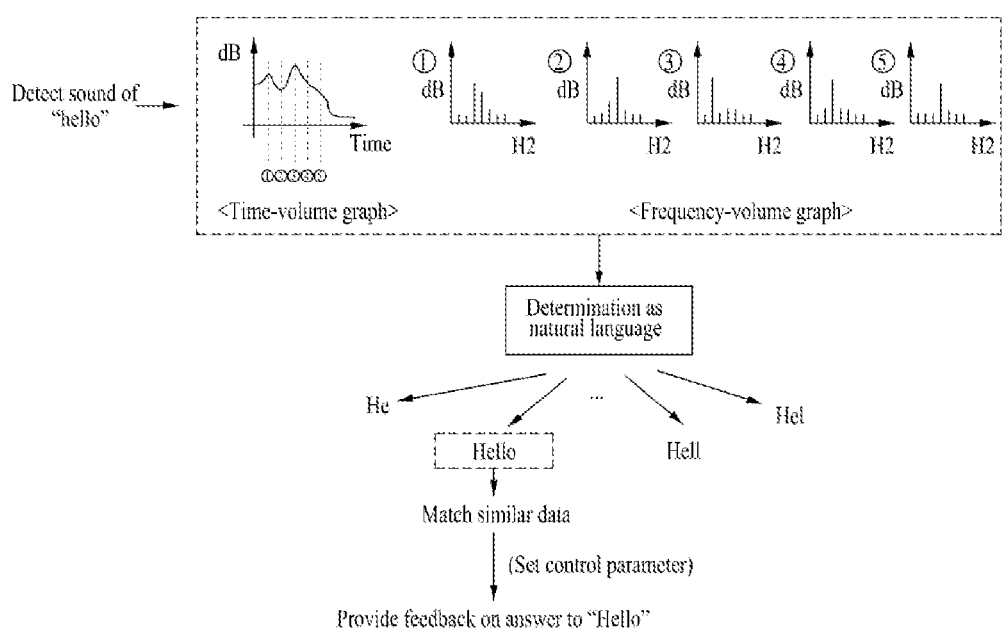
FIGS. 3A and 3B illustrate examples of distinguishing a natural language or a non-natural language and providing feedback according to an embodiment of the inventive concept.
Figure 3B:
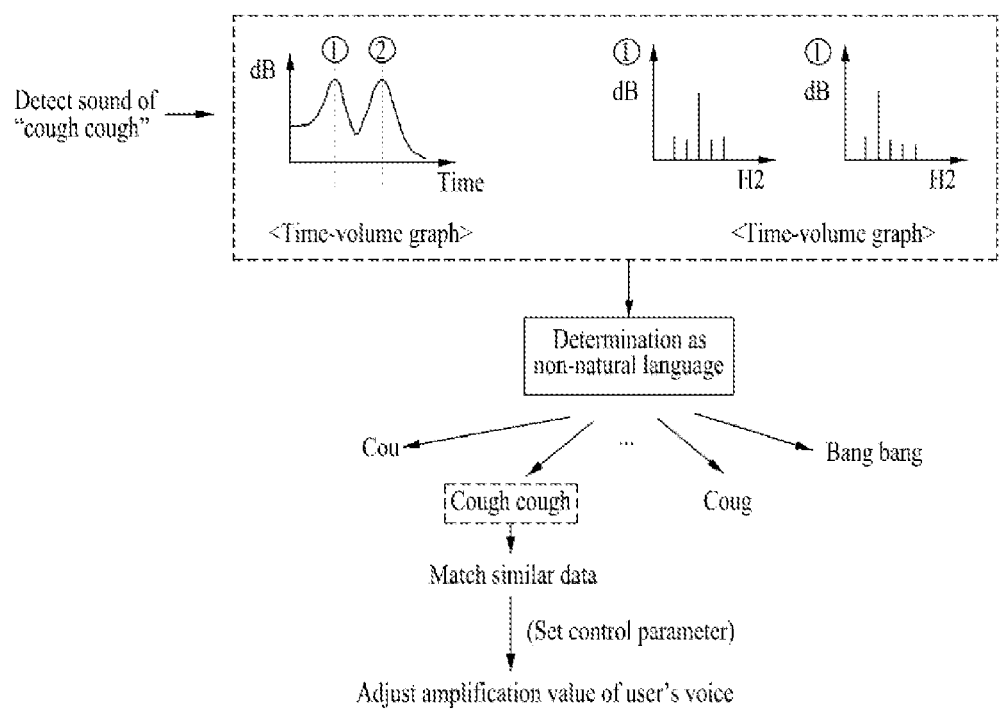

FIGS. 3A and 3B illustrate examples of distinguishing a natural language or a non-natural language and providing a feedback according to an embodiment of the inventive concept.

In detail, FIG. 3A illustrates an example of determining a natural language and providing feedback according to an embodiment of the inventive concept, and FIG. 3B illustrates an example of determining a non-natural language and providing feedback according to an embodiment of the inventive concept.

Referring to FIG. 3A, a smart hearing device according to an embodiment of the inventive concept may detect sound data of "Hello" from a first microphone and a second microphone, which are formed at one side. At this time, the sound data of "Hello" may indicate a specific pattern on a time-volume graph and a frequency-volume graph shown in FIG. 3A, and the smart hearing device according to an embodiment of the inventive concept may compare digital flow for sound data with a graph pattern previously stored in a database to determine the sound data as a natural language.

After the determination of the natural language, the smart hearing device according to an embodiment of the inventive concept may match similar data for the natural language. For example, the smart hearing device according to an embodiment of the inventive concept may try to match similar data close to the detected "Hello" and may match similar data of "Hello" similar to sound data of "Hello" among data such as 'He', 'Hell', and 'Hel'.

According to the matching of the similar data, the smart hearing device according to an embodiment of the inventive concept may set control parameters of at least any one or more of a change in amplification value, volume adjustment, and frequency adjustment in the natural language, may extract feedback in response to the sound data of "Hello", and may provide the user with the feedback with a sound. For example, the smart hearing device according to an embodiment of the inventive concept may provide the user with a voice message notification, such as "Yes, Hello", "Long time no see", or "May I help you?", as feedback on the sound data of "Hello".

Referring to FIG. 3B, the smart hearing device according to an embodiment of the inventive concept may detect sound data of "Cough Cough" from the first microphone and the second microphone, which are formed at one side. At this time, the sound data of "Cough Cough" may indicate a specific pattern on a time-volume graph and a frequency-volume graph shown in FIG. 3B, and the smart hearing device according to an embodiment of the inventive concept may compare digital flow for sound data with a graph pattern previously stored in the database to determine the sound data as a non-natural language. As shown in FIGS. 3A and 3B, it may be verified that the natural language and the non-natural language indicate different graph patterns on the time-volume graph and the frequency-volume graph. The smart hearing device according to an embodiment of the inventive concept may distinguish and determine the natural language or the non-natural language using a difference between such graph patterns.

After the determination of the non-natural language, the smart hearing device according to an embodiment of the inventive concept may match similar data for the non-natural language. For example, the smart hearing device according to an embodiment of the inventive concept may try to match similar data close to the detected "Cough Cough" and may match similar data of "Cough Cough" similar to sound data of "Cough Cough" among data such as 'Cou', 'Coug', and 'Bang Bang'.

According to the matching of the similar data, the smart hearing device according to an embodiment of the inventive concept may set control parameters of at least any one or more of a change in amplification value, volume adjustment, and frequency adjustment in the non-natural language, may extract feedback in response to the sound data of "Cough Cough", and may provide the user with the feedback with a sound. For example, the smart hearing device according to an embodiment of the inventive concept may provide the user with a voice message notification, such as "I'll show you a nearby pharmacy", "You must have a cold", "Drink warm tea", or "Are you okay?", as feedback on the sound data of "Cough Cough".

Figure 4A:
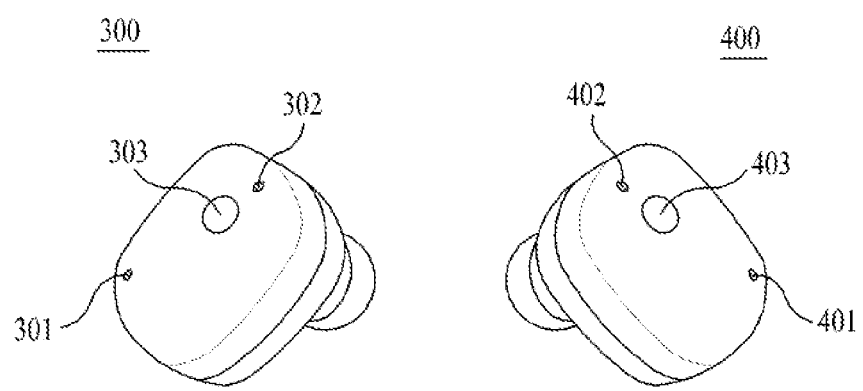
FIGS. 4A and 4B illustrate an embodiment of a smart hearing device according to an embodiment of the inventive concept.
Figure 4B:
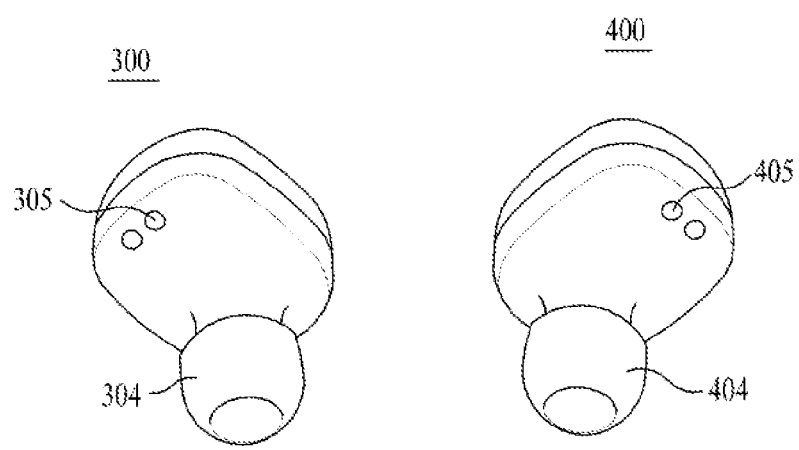

FIGS. 4A and 4B illustrate an embodiment of a smart hearing device according to an embodiment of the inventive concept.

As shown in FIGS. 4A and 4B, the smart hearing device according to an embodiment of the inventive concept may be in pairs to be worn on the left ear and the right ear of a user.

A first smart hearing device 300 and a second smart hearing device 400, which will be described below, may include the same function as a smart hearing device according to an embodiment of the inventive concept described with reference to FIGS. 1 to 3B.

Referring to FIG. 4A, the first smart hearing device 300 according to an embodiment of the inventive concept may include a first microphone 301, a second microphone 302, and an on/off switch 303, and the second smart hearing device 400 may include a third microphone 401, a fourth microphone 402, and an on/off switch 403. It is shown that the first smart hearing device 300 is worn on the left ear of the user and the second smart hearing device 400 is worn on the right ear of the user, but the location and shape where the smart hearing device is worn is not limited thereto.

At this time, the first microphone 301 and the third microphone 401 are characterized by being located adjacent to the mouth of the user to receive a voice signal based on a voice of the user and being located below the on/off switches 303 and 404 to be closer to the mouth of the user than the second microphone 302 and the fourth microphone 402.

Furthermore, the second microphone 302 and the fourth microphone 402 are characterized by being located as far as possible from the mouth of the user to receive a noise signal based on surrounding noise according to the location of the user and being located above the on/off switches 303 and 403 to be relatively further from the mouth of the user than the first microphone 301 and the third microphone 401.

In addition, directions where opens (or holes) of the first microphone 301 and the second microphone 302 and opens (or holes) of the third microphone 401 and the fourth microphone 402 are faced are characterized by being the same as each other. This is to collect each of a uniform voice signal and a uniform noise signal and remove suitable noise according to it.

As shown in FIG. 4A, the first smart hearing device 300 and the second smart hearing device 400 according to an embodiment of the inventive concept may include the two microphones 301 and 302 and 401 and 402 with different locations, may set the first microphone 301 and the third microphone 401 to main microphones in software, and may apply the second microphone 302 and the fourth microphone 402 to secondary input sources to uniformly collect different voice signals and different noise signals.

At this time, the first microphone 301 of the first smart hearing device 300 and the third microphone 401 of the second smart hearing device 400 may be characterized by being paired with each other, and the second microphone 302 of the first smart hearing device 300 and the four microphone 402 of the second smart hearing device 400 may be characterized by being paired with each other. A microphone paired with any one microphone may also be set automatically according to a setting applied to any one microphone.

For example, when volume of the first microphone 301 is up to a certain value by a control parameter, volume of the paired third microphone 401 may be also up to the certain value automatically. For another example, when the second microphone 302 of the first smart hearing device 300 is powered on, the fourth microphone 402 of the paired second smart hearing device 400 may also be powered on automatically.

Referring to FIG. 4A, the first smart hearing device 300 and the second smart hearing device 400 may include the on/off switches 303 and 403, and the on/off switch 303 and 403 may turn on or off power supplies of the first smart hearing device 300 and the second smart hearing device 400. For example, when a user touches, pushes, or presses and holds the on/off switch 303 and 403 in the form of a switch, the first smart hearing device 300 and the second smart hearing device 400 may be turned on or off. At this time, when at least any one of the first smart hearing device 300 and the second smart hearing device 400 is turned on or off, the other paired smart hearing device may also be turned on or off in the same manner.

Referring to FIG. 4B, the first smart hearing device 300 and the second smart hearing device 400 may include charging modules 305 and 405 and speakers 304 and 404.

The first smart hearing device 300 and the second smart hearing device 400 according to an embodiment of the inventive concept may be rechargeable devices, which may include the charging modules (charging terminals) 305 and 405.

For example, the first smart hearing device 300 and the second smart hearing device 400 according to an embodiment of the inventive concept may include a rechargeable Li-ion polymer battery and a battery meter of a mobile device and may charge batteries by means of the charging modules 305 and 405.

Furthermore, the first smart hearing device 300 and the second smart hearing device 400 according to an embodiment of the inventive concept may provide a sound converted from a digital signal to an analog signal (acoustic energy) through the speakers 304 and 404.

For example, the first smart hearing device 300 and the second smart hearing device 400 according to an embodiment of the inventive concept may set a first control parameter and a second control parameter according to information associated with the result of analyzing voice signals and noise signals collected from the first microphone 301, the second microphone 302, the third microphone 401, and the fourth microphone 402 and may convert a digital signal, where balances of at least any one or more of a change in amplification value, volume adjustment, and frequency adjustment are adjusted, into an analog signal to provide the user with a sound through the speakers 304 and 404.

Figure 5:
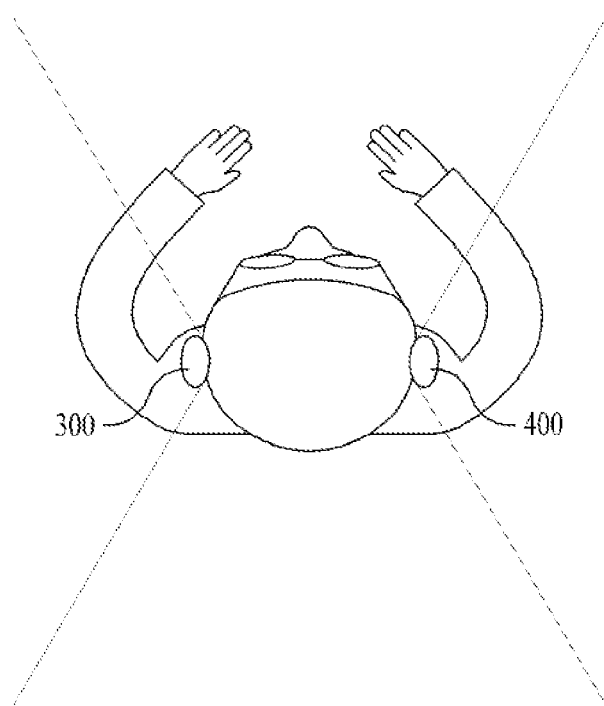
FIGS. 5, 6A, and 6B illustrate examples of applying a smart hearing device according to an embodiment of the inventive concept.
Figure 6A:
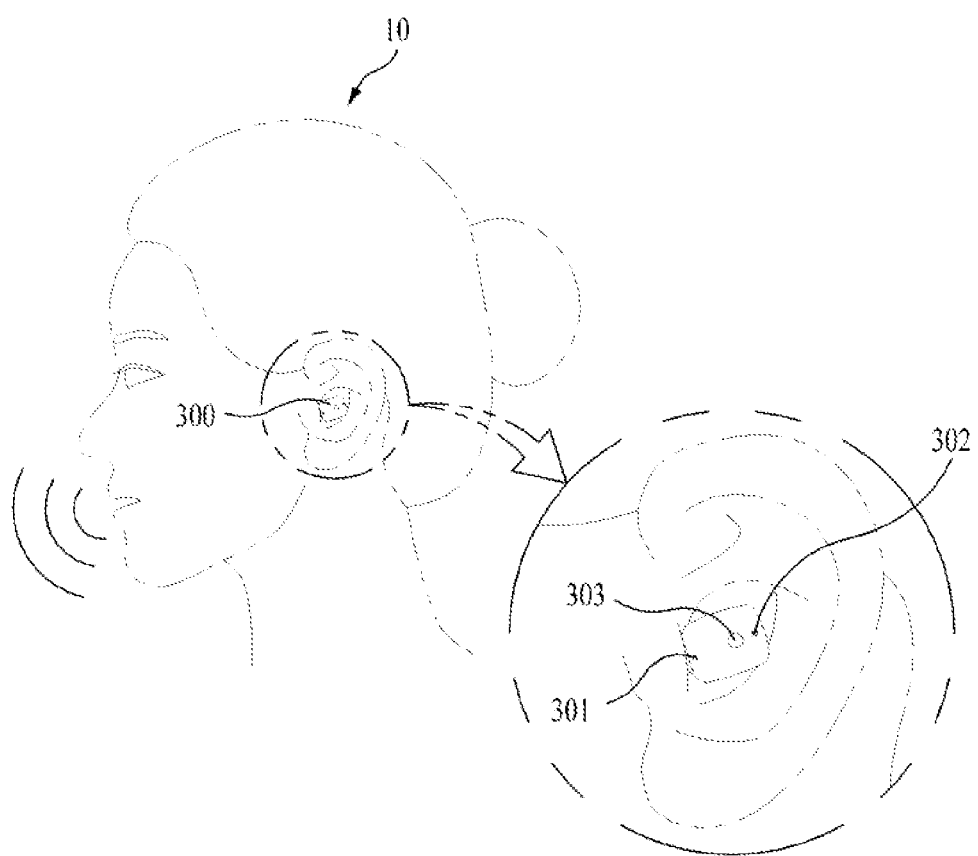
Figure 6B:
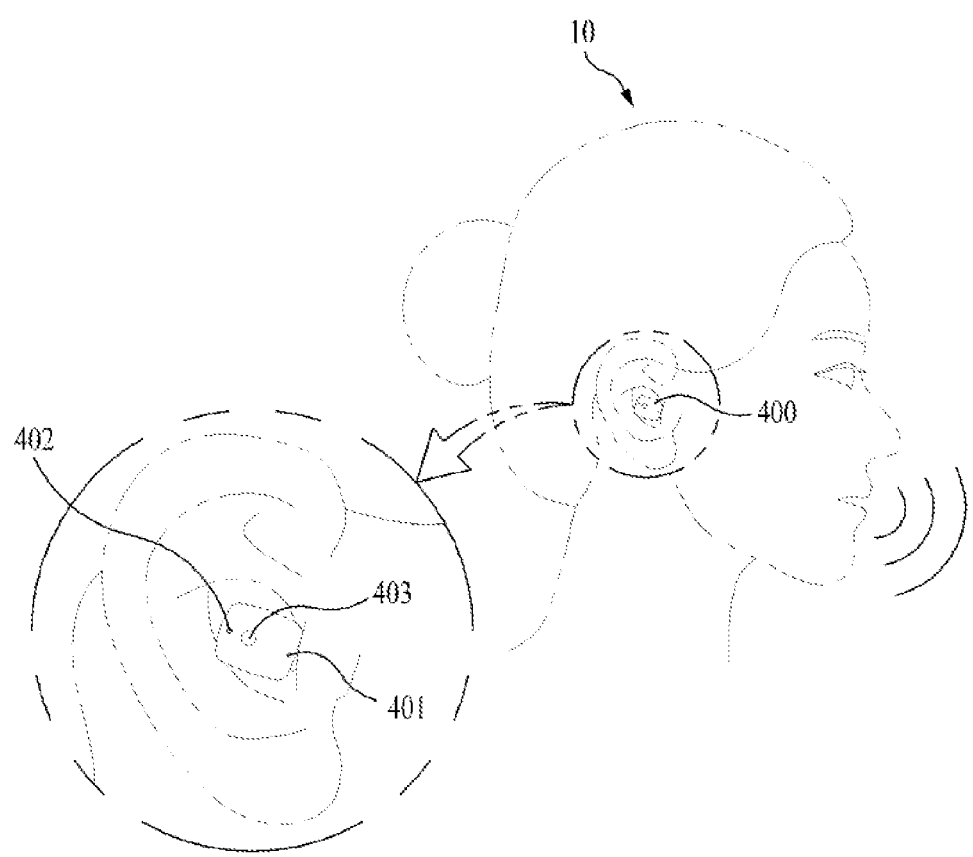

FIGS. 5, 6A, and 6B illustrate examples of applying a smart hearing device according to an embodiment of the inventive concept.

In detail, FIG. 5 illustrates an example of seeing a user who wears a smart hearing device according to an embodiment of the inventive concept from the top, FIG. 6A illustrates an example of seeing a user who wears a first smart hearing device according to an embodiment of the inventive concept from the left, and FIG. 6B illustrates an example of seeing a user who wears a second smart hearing device according to an embodiment of the inventive concept from the right.

Referring to FIG. 5, a user 10 may wear a first smart hearing device 300 on his or her left ear and may wear a second smart hearing device 400 on his or her right ear. The user 10 may wear both the first smart hearing device 300 and the second smart hearing device 300 to more three-dimensionally recognize an environmental change and a noise change according to left and right sound directionality and receive a customized hearing aid service.

Referring to FIG. 6A, the first smart hearing device 300 according to an embodiment of the inventive concept may be worn on the left ear of the user 10, and the first microphone 301 and the second microphone 302 may be placed at different distances from the mouth of the user 10.

For example, the first microphone 301 may be located more adjacent to the mouth of the user 10 than the second microphone 302 and may receive a voice signal based on a voice of the user. On the other hand, the second microphone 302 may be located as further as possible from the mouth of the user 10 than the first microphone 301 and may receive a noise signal based on surrounding noise according to the location of the user 10.

At this time, as shown in FIG. 6A, it may be verified that the first microphone 301 and the second microphone 302 are located close to the mouth of the user 10 or away from the mouth of the user 10, with respect to the on/off switch 303.

The first microphone 301 and the second microphone 302 may be included at different locations in the first smart hearing device 300 according to an embodiment of the inventive concept, but directions where openings (or holes) of the first microphone 301 and the second microphone 302 are faced may be characterized by being the same as each other to collect a uniform voice signal and a uniform noise signal and remove suitable noise according to it.

Referring to FIG. 6B, the second smart hearing device 400 according to an embodiment of the inventive concept may be worn on the right ear of the user 10, and the third microphone 401 and the fourth microphone 402 may be placed at different distances from the mouth of the user 10.

For example, the third microphone 401 may be located more adjacent to the mouth of the user 10 than the fourth microphone 402 and may receive a voice signal based on a voice of the user 10. On the other hand, the fourth microphone 402 may be located as further as possible from the mouth of the user 10 than the third microphone 401 and may receive a noise signal based on surrounding noise according to the location of the user 10.

At this time, as shown in FIG. 6B, it may be verified that the third microphone 401 and the fourth microphone 402 are located close to the mouth of the user 10 or away from the mouth of the user 10, with respect to the on/off switch 403.

The third microphone 401 and the fourth microphone 402 may be included at different locations in the second smart hearing device 400 according to an embodiment of the inventive concept, but directions where openings (or holes) of the third microphone 401 and the fourth microphone 402 are faced may be characterized by being the same as each other to collect a uniform voice signal and a uniform noise signal and remove suitable noise according to it.

Figure 7:
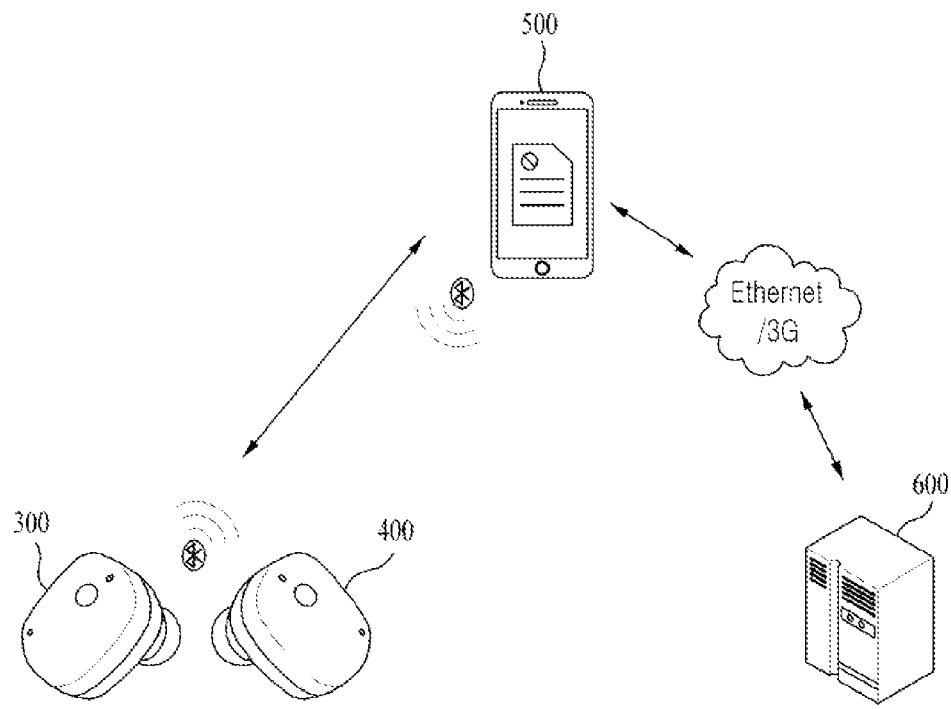
FIG. 7 illustrates a configuration of an artificial intelligence hearing system according to an embodiment of the inventive concept.

FIG. 7 illustrates a configuration of an artificial intelligence hearing system according to an embodiment of the inventive concept.

Referring to FIG. 7, the artificial intelligence hearing system according to an embodiment of the inventive concept may include a first smart hearing device 300 formed at one side and a second smart hearing device 400 formed at the other side, and may include a mobile device 500 for controlling the first smart hearing device 300 and the second smart hearing device 400. Furthermore, the artificial intelligence hearing system according to an embodiment of the inventive concept may further include an external server 600.

The first smart hearing device 300 may determine a natural language or a non-natural language for first sound data including a voice signal and a noise signal received from a first microphone and a second microphone formed at one side and may set a first control parameter due to matching of similar data for the determined natural language or non-natural language to provide a sound of one side. Furthermore, the first smart hearing device 400 may determine a natural language or a non-natural language for second sound data including a voice signal and a noise signal received from a third microphone and a fourth microphone formed at the other side and may set a second control parameter due to matching of similar data for the determined natural language or non-natural language to provide a sound of the other.

The first smart hearing device 300 and the second smart hearing device 400 may include the first microphone and the third microphone located near the mouth of a user and may include the second microphone and the fourth microphone located at a spaced distance from the mouth of the user. At this time, the first microphone and the third microphone may collect a voice signal of the user at one side and the other side, and the second microphone and the fourth microphone may collect a noise signal of one side and a noise signal of the other.

In detail, the first smart hearing device 300 may be worn on the left ear of the user, may receive a voice signal of the user at the left via the first microphone located near the mouth of the user, and may receive a noise signal at the left via the second microphone located at a spaced distance from the mouth of the user. Furthermore, the second smart hearing device 400 may be worn on the right ear of the user, may receive a voice signal of the user at the right via the third microphone located near the mouth of the user, and may receive a noise signal at the left via the fourth microphone located at a spaced distance from the mouth of the user.

At this time, the first microphone of the first smart hearing device 300 and the third microphone of the second smart hearing device 400 and the second microphone of the first smart hearing device 300 and the four microphone of the second smart hearing device 400 may be characterized by being paired with each other. A microphone paired with any one microphone may also be set automatically according to a setting applied to any one microphone. For example, when volume of the first microphone is adjusted by a first control parameter, volume of the paired third microphone may also be paired automatically. For another example, when the second microphone of the first smart hearing device 300 is powered on, the fourth microphone of the paired second smart hearing device 400 may also be powered on automatically.

The first smart hearing device 300 and the second smart hearing device 400 may set the first control parameter and the second control parameter of different parameter values, respectively, based on left hearing data and right hearing data of the user.

As an embodiment, the first smart hearing device 300 and the second smart hearing device 400 may respectively include hearing data (a personal hearing profile) for the left and the right of the user who uses a hearing aid. For example, because left and right hearing data of the user may differ from each other, each of the first smart hearing device 300 and the second smart hearing device 400 may include volume the user prefers, specific volume recognizable by the user, a specific frequency, and user-customized hearing data including an amplification value, volume, and frequency range of a degree to which the user does not feel a sense of difference. At this time, the hearing data of the user may be stored and maintained in the mobile device 500 and the external server 600.

Herein, the hearing data is not limited to items or numerical values, such as an amplification value, volume, and a frequency. For example, the hearing data may further include a user preference and a numerical value for at least any one or more of non-linear compression information of amplifying a small sound to be large and reducing a loud sound to be small, directional information capable of accurately detecting a direction of sound, feedback information helping to amplify a sound received through a microphone and listening to the sound well without other noise, and noise cancellation information of reducing noise.

The first smart hearing device 300 and the second smart hearing device 400 according to an embodiment of the inventive concept may set a first control parameter and a second control parameter of at least any one or more of a change in amplification value, volume adjustment, and frequency adjustment according to an environmental change and a noise change and may provide a customized hearing aid service at the left and right, based on result information about the hearing data of the user and similar data determined as a natural language or a non-natural language.

As an embodiment, the first smart hearing device 300 may analyze sound data of a voice signal and a noise signal of a digital signal received from the first microphone and the second microphone to determine a natural language or a non-natural language, may set a first control parameter in similar data matched according to the determined result to adjust balances of at least any one or more of a change in amplification value, volume adjustment, and frequency adjustment, and may convert a digital signal for the adjusted signal and feedback into an analog signal to deliver a left sound to the user.

As another example, the second smart hearing device 400 may analyze sound data of a voice signal and a noise signal of a digital signal received from the third microphone and the fourth microphone to determine a natural language or a non-natural language, may set a second control parameter in similar data matched according to the determined result to adjust balances of at least any one or more of a change in amplification value, volume adjustment, and frequency adjustment, and may convert a digital signal for the adjusted signal and feedback into an analog signal to deliver a right sound to the user.

For example, at least any one or more of an amplification value, volume, and a frequency according to sound data received from the first microphone, the second microphone, the third microphone, and the fourth microphone may be preset by the user or may depart from a preferred reference range. This may be based on any one of a factor according to a change in the environment where the user is located, a factor according to a change in the voice of the user, a factor of a mechanical error, and a pitch factor by a natural language or a non-natural language. Thus, the first smart hearing device 300 and the second smart hearing device 400 may apply the first control parameter and the second parameter to sound data to adjust balances of at least any one or more of an amplification value, volume, and a frequency for sound data and may convert a digital signal according to the adjusted balances into an analog signal (acoustic energy) to provide the user with a sound.

In other words, the first smart hearing device 300 and the second smart hearing device 400 of the artificial intelligence hearing system according to an embodiment of the inventive concept may analyze sound data including voice signals and noise signals received from the first microphone, the second microphone, the third microphone, and the fourth microphone depending on an environmental change of the user and a noise change to determine a natural language or a non-natural language and may set a first control parameter and a second control parameter for the matched similar data, thus providing a hearing aid service optimized for a changed situation although the user separately adjusts volume or a frequency to improve the convenience of using a hearing aid.

Furthermore, in other words, the first smart hearing device 300 and the second smart hearing device 400 of the artificial intelligence hearing system according to an embodiment of the inventive concept may provide the user with a left sound and a right sound in a customized form, respectively, to three-dimensionally recognize an environmental change and a noise change according to left and right sound directionality.

The mobile device 500 may control the first smart hearing device 300 and the second smart hearing device 400.

As shown in FIG. 7, the first smart hearing device 300 and the second smart hearing device 400 and the mobile device 500 may transmit and receive data through Bluetooth communication which is a short-range wireless communication module. For example, the mobile device 500 may receive sound data including voice signals and noise signals, the determined result determined as the natural language or the non-natural language, similar data, and information associated with feedback, from the first smart hearing device 300 and the second smart hearing device 400 through Bluetooth communication.

Thereafter, the mobile device 500 may transmit information received from the first smart hearing device 300 and the second smart hearing device 400 to the external server 600 through wireless data communication of Ethernet/3G, 4G, or 5G.

At this time, the mobile device 500 may be a terminal device of the user who uses the first smart hearing device 300 and the second smart hearing device 400, which may be at least any one of a personal computer (PC), a laptop computer, a smart phone, a tablet, and a wearable computer and may perform the overall operation of a service, such as service screen configuration, a data input, data transmission and reception, or data storage, under control of a web/mobile site or a dedicated application. Furthermore, the mobile device 500 may refer to an application downloaded and installed in the mobile device 500.

According to an embodiment, the mobile device 500 may display a screen including a plurality of items respectively located on a plurality of regions on a display unit (not shown) and may display another screen including at least one or more items associated with a function based on a touch-sensitive surface receiving an input from the user based on haptic contact or tactile contact, a sensor, or a sensor set. Furthermore, the mobile device 500 may receive a selective input of the user through an input unit (not shown), such as a keyboard, a touch display, a dial, a slider switch, a joystick, or a mouse, and may output information associated with a customized hearing aid service through an output unit (not shown) including an audio module, a speaker module, and a vibration module.

The mobile device 500 may interwork with each of the first smart hearing device 300 and the second smart hearing device 400 to provide a screen for testing hearing of the user and information associated with various reports according to it. At this time, the report may be a history index or record for a customized hearing aid service over time.

Furthermore, the mobile device 500 may store sound data including voice signals and noise signals, the determined result determined as the natural language or the non-natural language, similar data, and information associated with feedback from the first smart hearing device 300 and the second smart hearing device 400, in a database.

Furthermore, the mobile device 500 may turn on or off a power supply of each of the first smart hearing device 300 and the second smart hearing device 400 depending on a selective input of the user and may manually control numerical values such as amplification values, volume, and frequencies of the first smart hearing device 300 and the second smart hearing device 400.

Furthermore, the mobile device 500 may be paired with a serial number or device information assigned to each of the first smart hearing device 300 and the second smart hearing device 400, which may perform battery management, loss management, or failure management of the first smart hearing device 300 and the second smart hearing device 400.

The external server 600 may digitize and store user information, hearing data according to the user information, and a suitable range of an amplification value, volume, a frequency, and the like the user prefers and may match the first smart hearing device 300, the second smart hearing device 400, and the mobile device 500 corresponding to the user information to construct a database. For example, the external server 600 may store sound data by the first smart hearing device 300 and the second smart hearing device 400, received via the mobile device 500 at intervals of a predetermined time, the determined result determined as the natural language or the non-natural language, similar data, and information associated with feedback in a database.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond.

A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The computer-readable media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter. The described hardware devices may be configured to act as one or more software modules to perform the operations of the above-described exemplary embodiments of the inventive concept, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

The invention claimed is:

1. A smart hearing device for distinguishing a natural language or a non-natural language, the smart hearing device comprising:
    a receiving unit configured to receive sound data of a voice signal and a noise signal from a first microphone and a second microphone being formed at one side;
    a determination unit configured to compare digital flow of the sound data with a previously stored graph pattern to determine a natural language or a non-natural language for the sound data;
    a processing unit configured to match similar data for the determined natural language or non-natural language, based on a database including a natural language area and a non-natural language area;
    a providing unit configured to provide a user with a sound of one side, the sound being converted by setting a control parameter in a natural language or a non-natural language specified according to the matched similar data; and
    a feedback transmitting unit configured to provide feedback in response to the natural language or the non-natural language specified according to the matched similar data.

2. The smart hearing device of claim 1, wherein the receiving unit detects the voice signal and the noise signal from the first microphone and the second microphone formed at different locations and digitally converts the voice signal and the noise signal to receive the sound data.

3. The smart hearing device of claim 2, wherein the determination unit compares digital flow of the digitally converted sound data with a graph pattern of a volume graph for time and a volume graph for frequency, the graph pattern being previously stored, to determine a natural language or a non-natural language indicating a specific pattern in values of the graph.

4. The smart hearing device of claim 1, wherein the processing unit matches similar data of a word and sentence similar to the sound data determined as the natural language or matches similar data of environmental noise, noise, and a new sound similar to the sound data determined as the non-natural language, based on the database.

5. The smart hearing device of claim 4, wherein the providing unit sets control parameters of at least any one or more of a change in amplification value, volume adjustment, and frequency adjustment according to an environmental change based on hearing data of the user and the natural language or the non-natural language specified according to the matched similar data and provides the sound of one side in a user-customized form.

6. The smart hearing device of claim 5, wherein the providing unit sets the control parameters in the sound data of a digital signal received from the first microphone and the second microphone to adjust balances of at least any one or more of the change in amplification value, the volume adjustment, and the frequency adjustment and converts a digital signal for the adjusted signal into an analog signal to provide the user with the sound of one side.

7. The smart hearing device of claim 1, wherein the feedback transmitting unit provides feedback of a word and sentence in response to the similar data, when the similar data of a word and sentence similar to the sound data determined as the natural language or the non-natural language is matched by the processing unit.

8. The smart hearing device of claim 7, wherein the feedback transmitting unit extracts the feedback of the word and sentence in response to a question due to a voice of the user and transmits the feedback with a voice message, when the similar data of the word and sentence similar to the sound data is matched based on artificial intelligence (AI).

9. An artificial intelligence hearing system, comprising:
a first smart hearing device configured to determine a natural language or a non-natural language for first sound data including a voice signal and a noise signal received from a first microphone and a second microphone formed at one side and set a first control parameter due to matching of similar data for the determined natural language or non-natural language to provide a sound of one side;
a second smart hearing device configured to determine a natural language or a non-natural language for second sound data including a voice signal and a noise signal received from a third microphone and a fourth microphone formed at the other side and set a second control parameter due to matching of similar data for the determined natural language or non-natural language to provide a sound of the other; and
a mobile device configured to control the first smart hearing device and the second smart hearing device.

10. The artificial intelligence hearing system of claim 9, wherein the first smart hearing device and the second smart hearing device respectively include the first microphone and the third microphone located near the mouth of a user and respectively include the second microphone and the fourth microphone located at a spaced distance from the mouth of the user.

11. The artificial intelligence hearing system of claim 9, wherein the first smart hearing device and the second smart hearing device respectively provide a user with a sound of one side and a sound of the other in a customized form to three-dimensionally recognize an environmental change and a noise change according to left and right sound directionality.

12. The artificial intelligence hearing system of claim 9, wherein the first smart hearing device and the second smart hearing device respectively set the first control parameter and the second control parameter, each of which has a different parameter value, based on left hearing data and right hearing data of a user.

13. The artificial intelligence hearing system of claim 9, wherein the mobile device controls any one or more of power-on/off of each of the first smart hearing device and the second smart hearing device, signal collection, and a control parameter setting depending on a selective input of a user.

14. An operation method of a smart hearing device for distinguishing a natural language or a non-natural language, the operation method comprising:
receiving sound data of a voice signal and a noise signal from a first microphone and a second microphone formed at one side;
comparing digital flow of the sound data with a previously stored graph pattern to determine a natural language or a non-natural language for the sound data;
matching similar data for the determined natural language or non-natural language, based on a database including a natural language area and a non-natural language area;
providing a user with a sound of one side, the sounding being converted by setting a control parameter in a natural language or a non-natural language specified according to the matched similar data; and
providing feedback in response to the natural language or the non-natural language specified according to the matched similar data.

* * * * *